(12) United States Patent
Lin

(10) Patent No.: US 10,288,102 B2
(45) Date of Patent: May 14, 2019

(54) FASTENING DEVICE HAVING A TUBULAR SLEEVE MEMBER FOR MOUNTING ON A TUBE OR IMMOBILIZING TWO TELESCOPICALLY CONNECTED TUBES

(71) Applicant: Chien-Ting Lin, Santa Fe Springs, CA (US)

(72) Inventor: Chien-Ting Lin, Santa Fe Springs, CA (US)

( * ) Notice: Subject to any disclaimer, the term of this patent is extended or adjusted under 35 U.S.C. 154(b) by 422 days.

(21) Appl. No.: 15/007,250

(22) Filed: Jan. 27, 2016

(65) Prior Publication Data

US 2016/0215803 A1     Jul. 28, 2016

(30) Foreign Application Priority Data

Jan. 27, 2015    (CN) .................... 2015 2 0055023 U

(51) Int. Cl.
     *F16B 7/14*           (2006.01)

(52) U.S. Cl.
     CPC ................... *F16B 7/1418* (2013.01)

(58) Field of Classification Search
CPC ......... Y10T 403/7058; Y10T 403/7062; Y10T 403/7066; Y10T 403/7067; F16B 7/1418; F16B 2/065; F16B 2/128; B62K 19/36; B62J 1/108; F16M 11/245; F16M 11/28
USPC ...................................................... 403/109.1
See application file for complete search history.

(56) References Cited

U.S. PATENT DOCUMENTS

| | | | | |
|---|---|---|---|---|
| 3,832,072 A * | 8/1974 | Mazur | ...................... | F16B 7/06 403/46 |
| 6,155,743 A * | 12/2000 | Chen | ..................... | F16B 7/1418 248/161 |
| 6,182,939 B1 * | 2/2001 | Schoepper | ................. | B62J 1/06 248/599 |
| 6,896,438 B1 * | 5/2005 | Chen | ..................... | B62K 19/36 403/290 |
| 7,195,377 B2 * | 3/2007 | Tsai | ...................... | F16M 11/16 362/419 |
| 7,757,582 B2 * | 7/2010 | Kua | ......................... | B62J 11/00 74/551.8 |

(Continued)

FOREIGN PATENT DOCUMENTS

WO    WO 2010139545 A1 * 12/2010 ......... E04H 12/2269

*Primary Examiner* — Amber R Anderson
*Assistant Examiner* — Nahid Amiri
(74) *Attorney, Agent, or Firm* — Lin & Associates Intellectual Property, Inc.

(57) ABSTRACT

A fastening device includes a tubular sleeve member adapted to be sleeved around a tube. The sleeve member defines a space for receiving the tube therein and a notch. The sleeve member further has first and second through holes aligned with the notch and a nut reception space defined in the first through hole. A fixing element includes a fixing nut disposed within the nut reception space, a fixing bolt extending through the through holes to fasten the fixing nut threadedly and a tightening-enforcing element disposed exterior of the nut reception space and mounted on the fixing bolt such that tightening of the fixing element relative to the fixing nut in a first section and further tightening of the tightening-enforcing element relative to the fixing bolt in a second section results in pressing of the sleeve member against the tube, thereby immobilizing the sleeve member and the tube relative to each other.

6 Claims, 7 Drawing Sheets

(56) References Cited

U.S. PATENT DOCUMENTS

| | | | | |
|---|---|---|---|---|
| 8,608,118 | B2* | 12/2013 | Lai | F16B 7/1454 248/74.1 |
| 9,464,650 | B2* | 10/2016 | Lin | F16B 7/1418 |
| 9,482,254 | B2* | 11/2016 | Lai | F16B 7/1418 |
| 2002/0076266 | A1* | 6/2002 | Mandon | A63C 11/221 403/102 |
| 2002/0081146 | A1* | 6/2002 | Tomm | B25G 1/04 403/109.1 |
| 2006/0291961 | A1* | 12/2006 | Tsai | F16M 11/16 405/221 |
| 2008/0298886 | A1* | 12/2008 | Chen | B62K 19/36 403/373 |
| 2010/0276928 | A1* | 11/2010 | Chang | F16B 7/1418 285/420 |
| 2011/0070021 | A1* | 3/2011 | Huang | F16B 7/1418 403/374.5 |
| 2011/0240078 | A1* | 10/2011 | Lenhart | A45B 9/00 135/75 |
| 2014/0294496 | A1* | 10/2014 | Gardiner | F16B 7/1454 403/374.2 |
| 2016/0201706 | A1* | 7/2016 | Heim | A45B 9/00 403/110 |

* cited by examiner

FASTENING DEVICE HAVING A TUBULAR SLEEVE MEMBER FOR MOUNTING ON A TUBE OR IMMOBILIZING TWO TELESCOPICALLY CONNECTED TUBES

CROSS-REFERENCE TO RELATED APPLICATION

This application claims the priority of Chinese patent application No. 201520055023.2, filed on Jan. 27, 2015, which is incorporated herewith by reference.

BACKGROUND OF THE INVENTION

Field of the Invention

The present invention relates generally to a fastening device, and more particularly to a fastening device including a tubular sleeve member for mounting on a tube or for immobilizing telescopically connected first and second tubes. The fastening device further includes at least one first fixing element mounted on the sleeve member such that tightening of the first fixing element relative to the tubular sleeve member in a first section results in a narrowing notch formed in the sleeve member but permits the tube to move axially in the sleeve member and further tightening of the first fixing element relative to the sleeve member in a second section after the first section results in pressing of the sleeve member against the tube, thereby immobilizing the sleeve member and the tube.

The Prior Arts

A conventional fastening device, such as a C-shaped clamp member, for holding an article, is mounted on a tube via a fastener member. However, during loosening of the fastener member relative to the tube, a notch of the clamp member is not sufficiently large enough to permit smooth sliding of the clamp member relative to the tube or is too wide and results in wobbling of the same relative to the tube.

Another conventional fastening device currently available is generally used in a tripod, such as a camera tripod, for telescopically connecting at least two tubes (first and second tubes). The fastening device has different configuration and structures and includes a conventional sleeve member for sleeving around the tubes. A fastener knob is generally used to tighten the sleeve member so as to tightly abut against the tubes, thereby preventing the tubes from disengaging relative to each other. However, it is noted that the conventional sleeve member has only the clamping structure but its clamping strength thereof cannot be adjusted in advance.

In short, the conventional sleeve member for telescopically connecting two tubes may lead to disengagement among them in the time of long use and in wobbling of relative to each other or a notch of the clamp member is not sufficiently large enough to permit smooth sliding of the tubes relative to each other.

SUMMARY OF THE INVENTION

A primary objective of the present invention is to provide a fastening device having a tubular sleeve member for securely mounting on a tube or for immobilizing telescopically connected two tubes.

A fastening device of the present invention for mounting on a first tube, and includes a tubular sleeve member and a first fixing element. The tubular sleeve member is adapted to be sleeved around the first tube, and defining a first reception space for receiving the first tube therein and a first notch for access into the first reception space and having an inner wall surface confining the first reception space, the sleeve member further having first and second through holes aligned with the first notch and a nut reception space defined in the first through hole. The first fixing element is mounted on the sleeve member at the first notch, includes a fixing nut disposed within the nut reception space, a fixing bolt extending through the second through hole and the first through hole to fasten the fixing nut threadedly and a tightening-enforcing element disposed exterior of at the nut reception space and mounted on a distal end of the fixing bolt such that tightening of the first fixing element relative to the fixing nut during a first section results in narrowing of the first notch and permits axial movement of the sleeve member on the tube and after tightening of the fixing bolt relative to the fixing nut and further tightening of the tightening-enforcing element relative to the fixing bolt in a second section results in pressing of the inner wall surface against the first tube, thereby causing tight engagement of the inner wall surface confining the first reception space and the first tube to immobilize the sleeve member and the first tube relative to each other.

In the above-mentioned fastening device, a second tube is provided to permit telescopic insertion of the first tube into the second tube, wherein the second tube has a diameter greater than that of the first tube.

Preferably, the sleeve member further defines a second reception space spatially communicated with the first reception space and a second notch for access into the second reception space. The fastening device of the present invention further includes a second fixing element mounted on the sleeve member at the second notch such that tightening of the second fixing element relative to the sleeve member results in pressing of the inner wall surface against the second tube, thereby causing tight engagement of the inner wall surface confining the second reception space and the second tube to prevent untimely removal of the sleeve member from the second tube, and wherein tightening of the fixing bolt relative to the fixing nut during the first section results in narrowing of the first notch and permits axial movement of the first tube in the second tube and the sleeve member without wobbling, and after tightening of the fixing bolt relative to the fixing nut and further tightening of the tightening-enforcing element relative to the fixing bolt in the second section results in pressing the sleeve member against the first tube so as to immobilize the first and second tubes relative to each other. Preferably, the second fixing element is constituted by a locking bolt and a fastener nut.

In one embodiment of the present invention, the sleeve member further has an inner peripheral wall that extends transversely relative to an axis of the first tube and that is formed with first and second engagement recesses of different depth and located exterior of the nut reception space. The tightening-enforcing element has an engaging rib formed on its outer surface thereof such that after the tightening-enforcing element is mounted on the distal end of the fixing bolt, the engaging rib engages in the first engagement recess and after tightening of the tightening-enforcing element relative to the fixing bolt in the second section results in engagement of the engaging rib in the second engagement recess in the sleeve member, wherein the first engagement recess has a depth greater than the second engagement recess.

In one embodiment of the present invention, the tightening-enforcing element has a flap portion formed with a cam face such that after the tightening-enforcing element is mounted on the distal end of the fixing bolt, the cam face is in contact with an exterior surface of the sleeve member adjacent to the nut reception space so that turning of the flap portion in a direction transverse to an axis of the fixing bolt causes tightening of the tightening-enforcing element relative to the fixing bolt in the second section, thereby immobilizing the first and second tubes relative to each other.

Since the first fixing element simultaneously includes the fixing nut and the tightening-enforcing element in addition to the fixing bolt, tightening of the fixing nut relative to the fixing bolt in advance can be precisely controlled, thereby permitting smooth axial sliding of the first tube in the second tube and preventing the undesired wobbling between the first and second tubes. Further tightening of the fixing bolt relative to the tightening-enforcing element results in pressing the sleeve member against the first tube so as to immobilize the first and second tubes relative to each other. In other words, the fastening device of the present invention is simple in structure but low in manufacturing cost, and facilitates in easily and swift assembly and provides longer service life.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
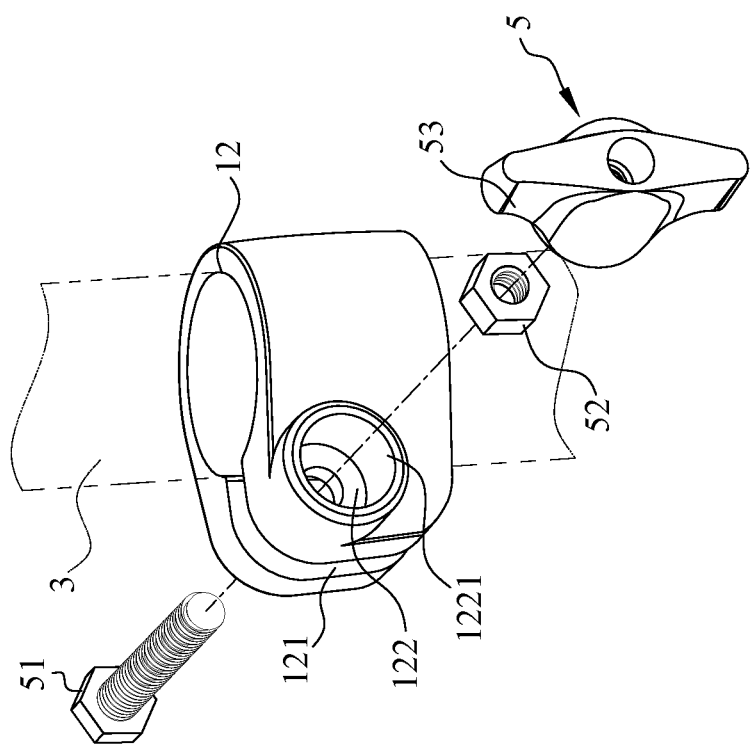
FIG. 1 shows a perspective view of a fastening device according to a first embodiment of the present invention in application.
Figure 2:
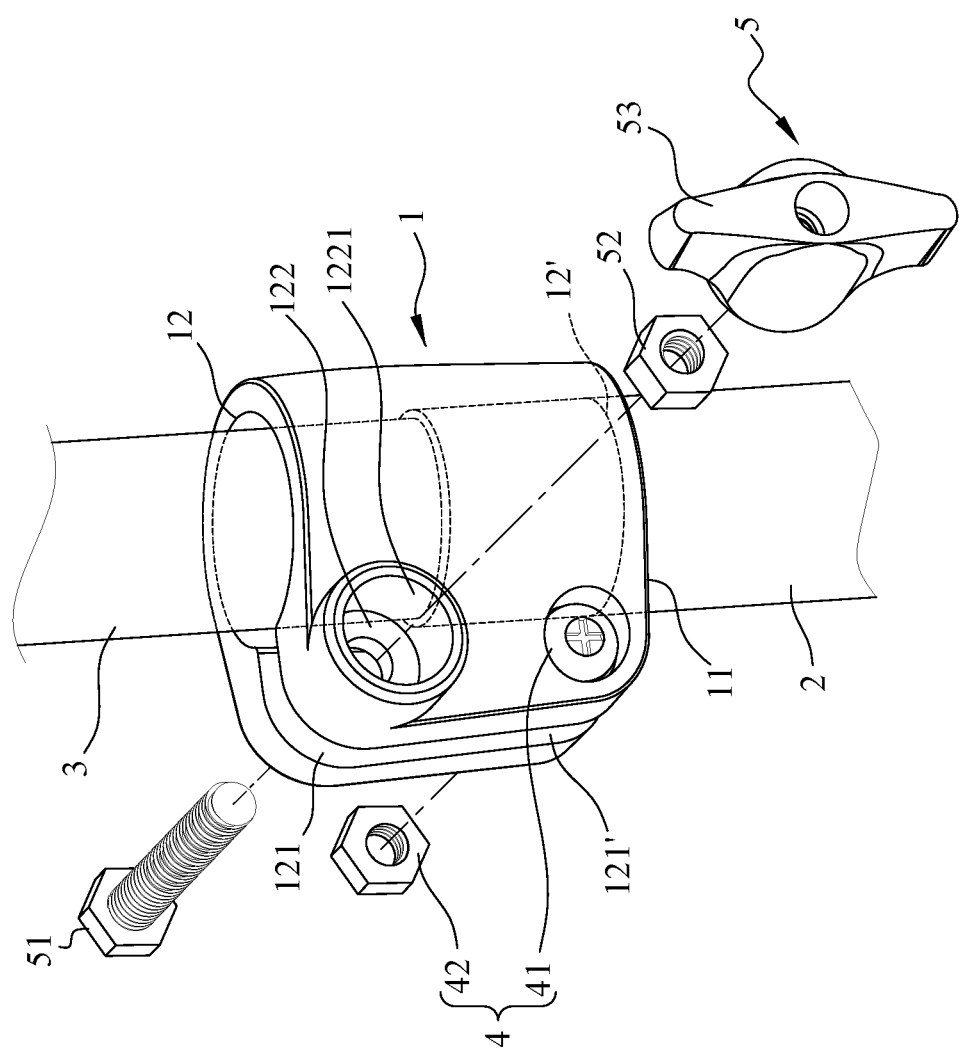
FIG. 2 illustrates a modified fastening device of the present invention in application.

Referring to FIGS. 1 and 2, wherein FIG. 1 shows a perspective view of a fastening device according to a first embodiment of the present invention in application and FIG. 2 illustrates a modified fastening device of the present invention in application. As shown, a fastening device of the present invention is intended for mounting on a tube or for immobilizing telescopically connected first and second tubes. The fastening device includes a tubular sleeve member 1, a first fixing element 5 and a second fixing element 4. The tubular sleeve member 1 is adapted to be sleeved around a first tube 3, and defines a first reception space 12 for receiving the first tube 3 therein and a first notch 121 for access into the first reception space 12 and has an inner wall surface confining the first reception space 12. The sleeve member 1 further has first and second through holes 122, 123 aligned with the first notch 121 and a nut reception space 1221 defined in the first through hole 122.

The first fixing element 5 is mounted on the sleeve member 1 at the first notch 121, and includes a fixing nut 52 disposed within the nut reception space 1221, a fixing bolt 51 extending through the second through hole 123 and the first through hole 122 to fasten the fixing nut 52 threadedly and a tightening-enforcing element 53 disposed at the exterior of the nut reception space 1221 and mounted on a distal end of the fixing bolt 51 such that tightening of the first fixing element 5 relative to the fixing nut 52 during a first section results in narrowing of the first notch 121 and permits axial movement of the sleeve member 1 on the first tube 3 and after tightening of the fixing bolt 51 relative to the fixing nut 52 and further tightening of the tightening-enforcing element 53 relative to the fixing bolt 51 in a second section results in pressing of the inner wall surface against the first tube 3, thereby immobilizing the sleeve member 1 and the first tube 3 relative to each other.

Referring to FIG. 2, in a modified fastening device of the present invention, a second tube 2 is provided to permit telescopic insertion of the first tube 3 into the second tube 2, wherein the second tube 2 has a diameter greater than that of the first tube 3 to permit telescopic insertion of the latter in the former. Preferably, the sleeve member 1 further defines a second reception space 12' spatially communicated with the first reception space 12 and a second notch 121' below the first notch 121 for access into the second reception space 12'. The second fixing element 4 is mounted on the sleeve member 1 at the second notch 121' and is constituted by a locking bolt 41 and a fastener nut 42 such that tightening of the locking bolt 41 relative to the fastener nut 42 results in pressing of the inner wall surface against the second tube 2, thereby causing tight engagement of the inner wall surface confining the second reception space 12' and the second tube 2 to prevent untimely removal of the sleeve member 1 from the second tube 2. Under this condition, tightening of the fixing bolt 51 relative to the fixing nut 52 during the first section results in narrowing of the first notch 121 and permits axial movement of the first tube 3 in the second tube 2 and the sleeve member 1 without wobbling, and after tightening of the fixing bolt 51 relative to the fixing nut 52, further tightening of the tightening-enforcing element 53 relative to the fixing bolt 51 in the second section pushes said tightening-enforcing element 53 to contact with and presses on the sleeve member 1 against the first tube 3 so as to immobilize the first and second tubes 3, 2, relative to each other.

Figure 3A:
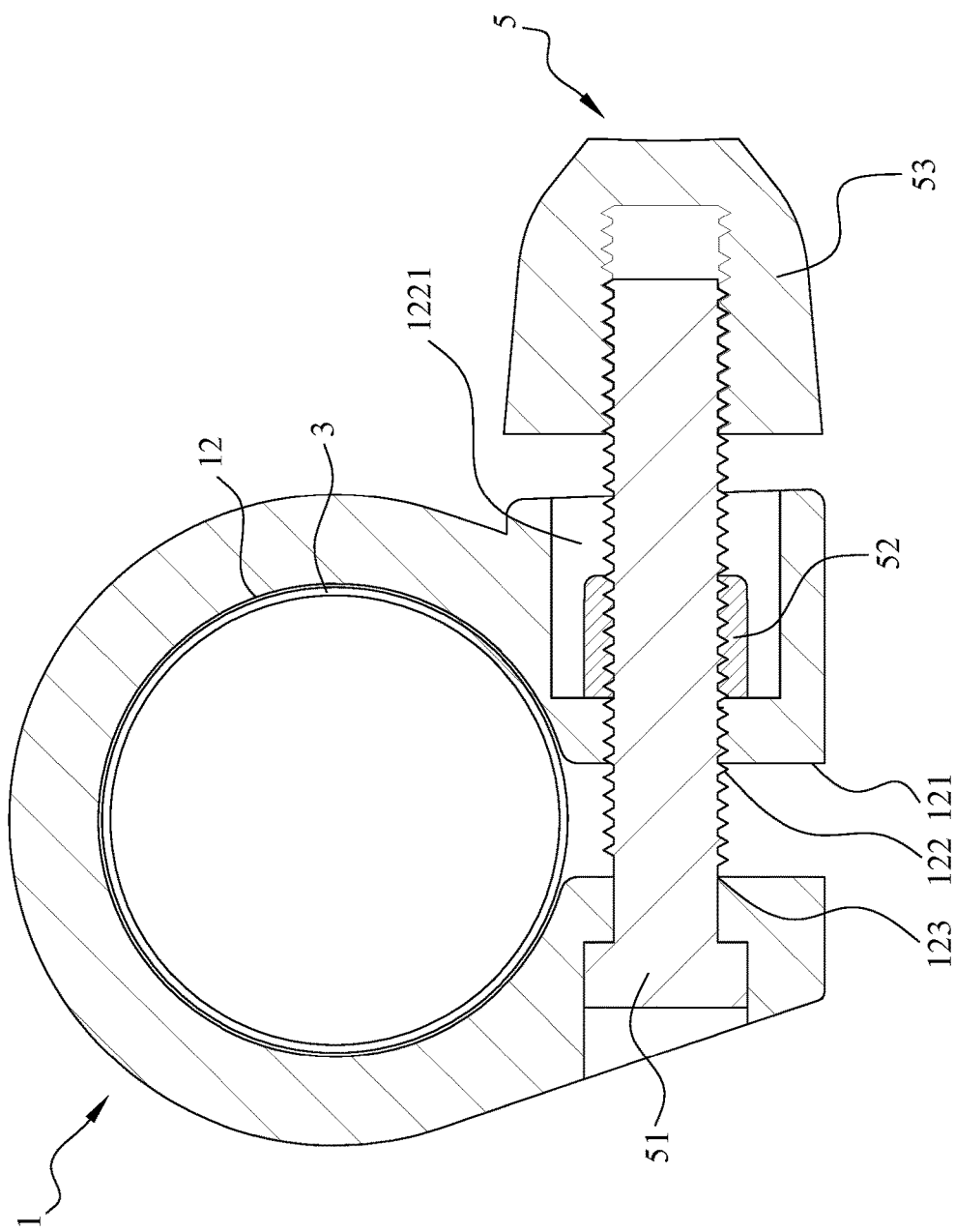
FIG. 3A is a fragmentary sectional and enlarged view of the fastening device according to the first embodiment of the present invention prior to a tightening operation.
Figure 3B:
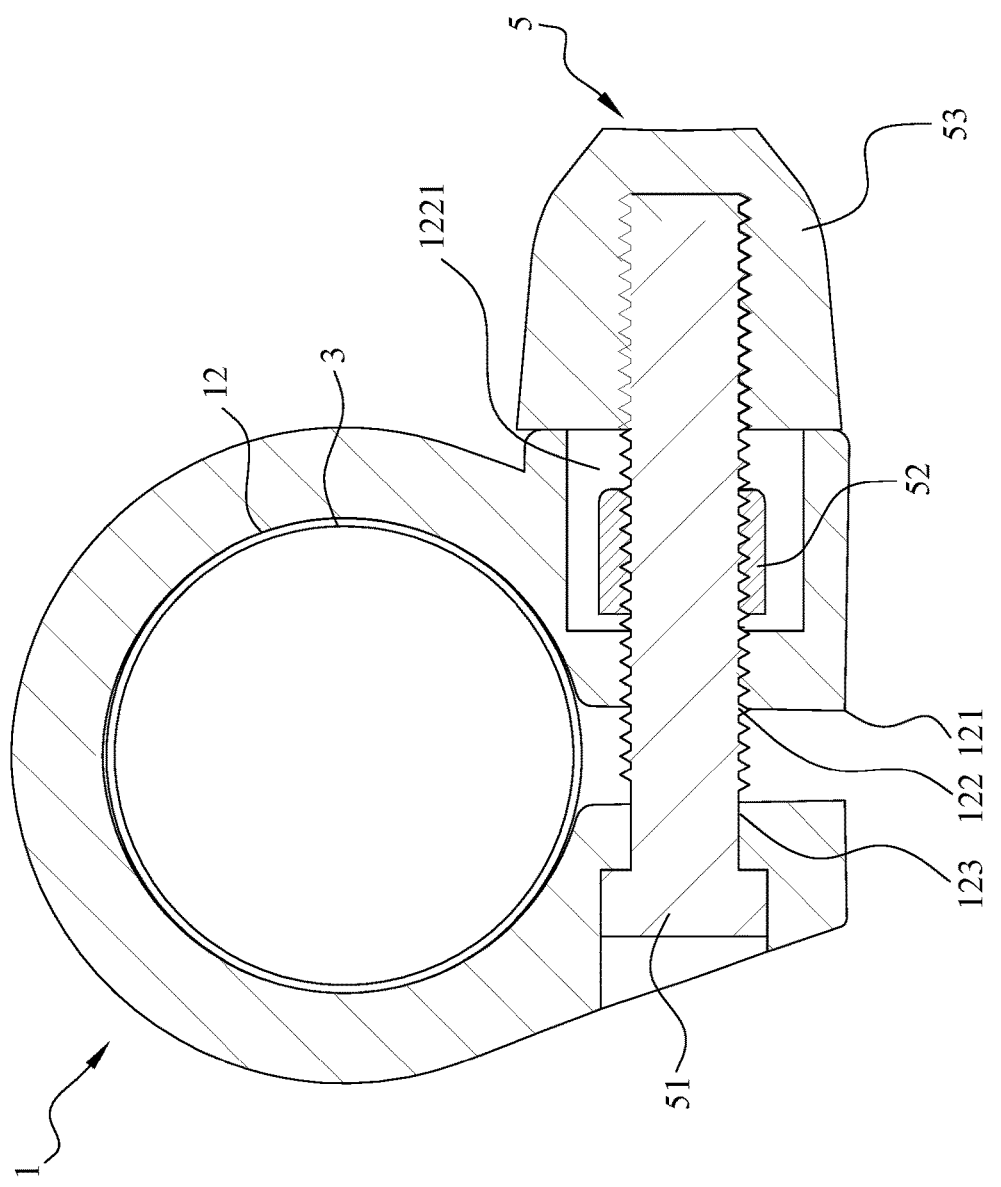
FIG. 3B is a fragmentary sectional and enlarged view of the fastening device according to the first embodiment of the present invention after the tightening operation.

Referring to FIGS. 3A and 3B, wherein, FIG. 3A is a fragmentary sectional and enlarged view of the modified fastening device of the present invention prior to a tightening operation; and FIG. 3B is a fragmentary sectional and enlarged view of the modified fastening device of the present invention after the tightening operation. As illustrated, the fixing bolt 51 extends through the second through hole 123 and the first through hole 122 in the sleeve member 1 to fasten the fixing nut 52 threadedly in the first section causes a slight narrow of the first notch 121 while the tightening-enforcing element 53 is disposed exterior of the nut reception space 1221 and is mounted on the distal end of the fixing bolt 53. It is to note that after the fixing bolt 51 is tightened relative to fixing nut 52 in the first section, even though the first notch 121 becomes slightly narrower, the first tube 3 is axially movable in the second tube 2 without wobbling such that after tightening of the fixing bolt 51 relative to the fixing nut 52 in the first section and further tightening of the tightening-enforcing element 53 relative the fixing bolt 51 in the second section pushes said tightening-enforcing element 53 to contact with and press on the sleeve member 1 against the first tube 3 so as to immobilize the first and second tubes 3, 2 relative to each other. It is important to note that the first tube 3 is movable axially and freely within the second tube 2 prior to the tightening operation of the tightening-enforcing element 53 relative to the fixing bolt 51. Generally, the user should in advance adjust the desired extension length of the first tube 3 relative to the second tube 2 before performing the tightening operation of the first fixing element 5 relative to the sleeve member 1.

Figure 4:
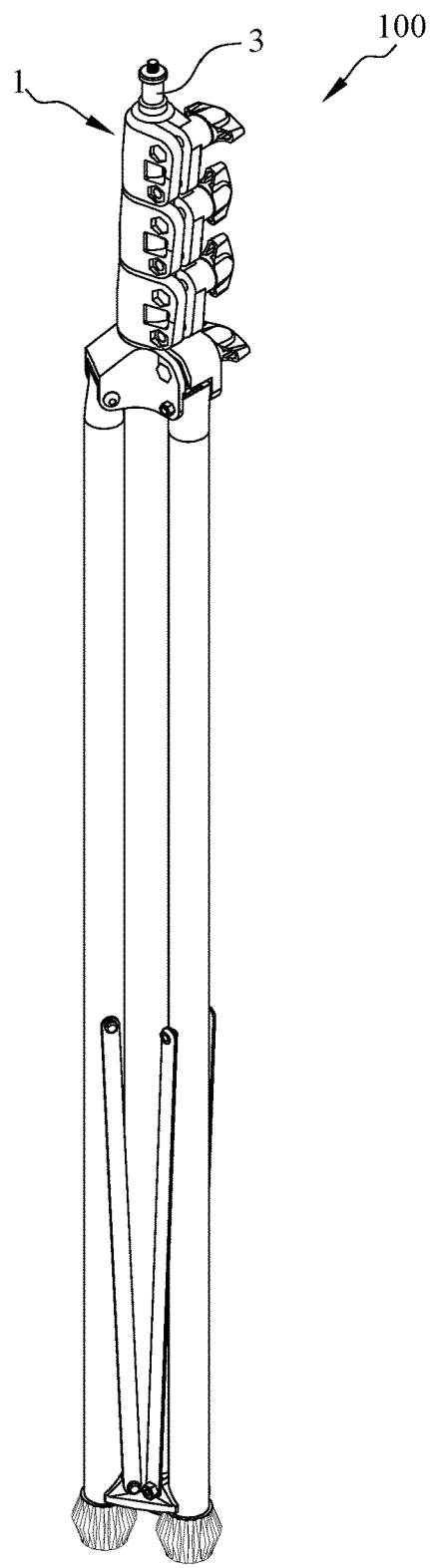
FIG. 4 illustrates how the fastening device of the present invention is applied in a tripod for camera.

FIG. 4 illustrates how the fastening device of the present invention is applied in a tripod for a camera or an astronomical telescope stand. When applying the fastening device of the present invention to a camera tripod, the sleeve member 1 as well as the first and second fixing elements 5, 4 are disposed around the first and second tubes 3, 2 of the tripod in such a manner that first tightening of the second fixing element 4 relative to the sleeve member 1 is conducted so as to prevent disengagement of the sleeve member 1 from the first and second tubes 3, 2. Once the length of the first tube 3 is adjusted relative to the second tube 2, tightening of the fixing bolt 51 relative to the fixing nut 52 in the first section results in narrowing the first notch 121 of the sleeve member 1 and further tightening of the tightening-enforcing element 53 relative to the fixing bolt 51 is conducted so as to press the sleeve member 1 against the first tube 3, thereby immobilizing the second and first tubes 2, 3 relative to each other. Under this condition, the user can mount his camera or astronomical telescope on the head of the first tube 3.

Figure 5:
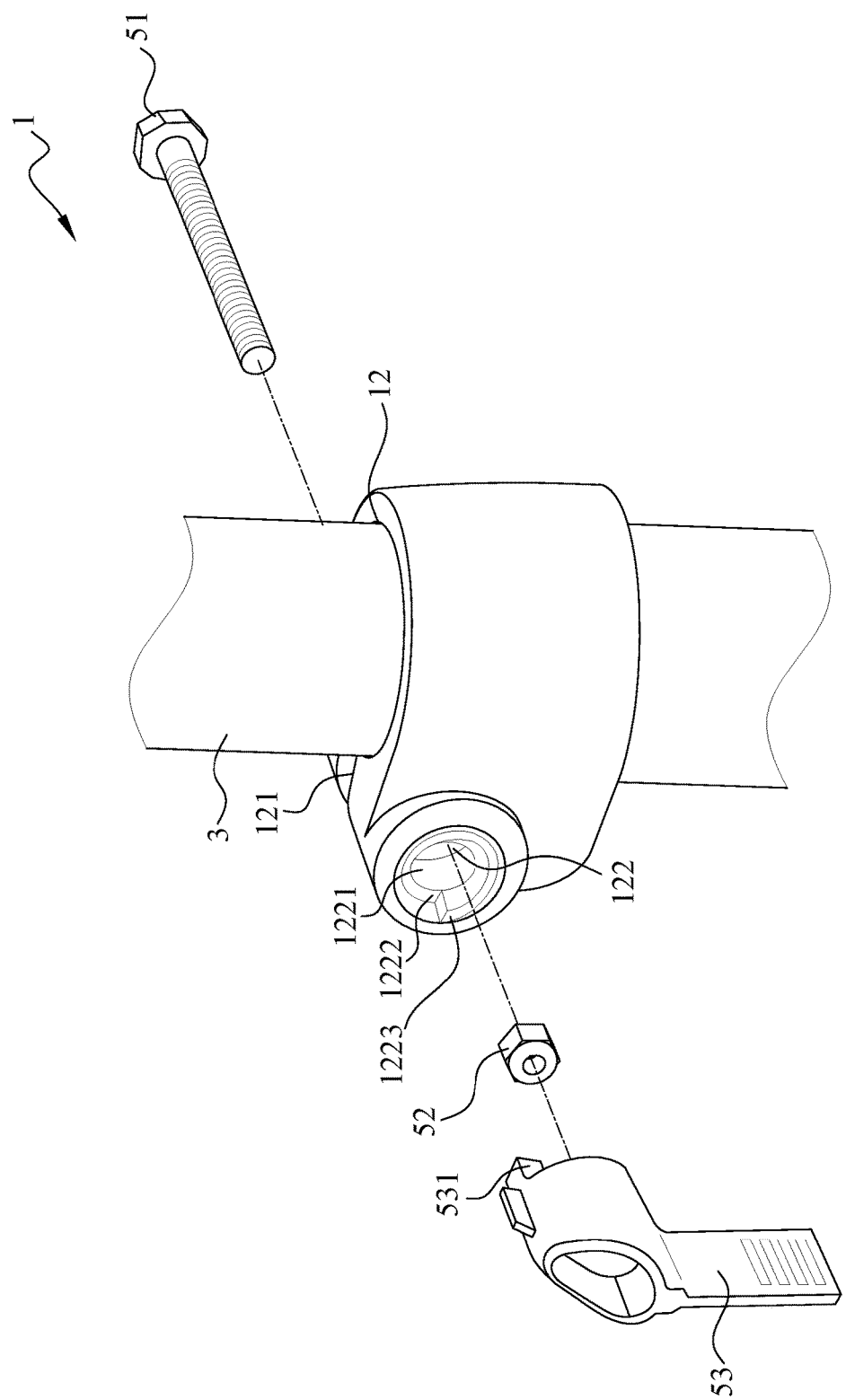
FIG. 5 a perspective view of a fastening device according to a second embodiment of the present invention.

FIG. 5 shows a perspective view of a fastening device according to a second embodiment of the present invention. The second embodiment is similar to the first embodiment in structure except that the sleeve member 1 further has an inner peripheral wall that extends transversely relative to an axis of the first tube 3 and that is formed with first engagement recess 1222 and second engagement recess 1223 of different depth and located exterior of the nut reception space 1221. The first engagement recess 1222 has a depth greater than the second engagement recess 1223. The tightening-enforcing element 53 has an engaging rib 531 formed on its outer surface thereof such that after the tightening-enforcing element 53 is mounted on the distal end of the fixing bolt 51, the engaging rib 531 engages in the first engagement recess 1222, in which, the sleeve member 1 is axially movable on the first tube 3, and after tightening of the tightening-enforcing element 53 relative to the fixing bolt 51 in the second section, the engaging rib 531 engages in the second engagement recess 1223 in the sleeve member 1, in which the the first tube 3 and the sleeve member 1 are immobilized relative to each other.

Figure 6:
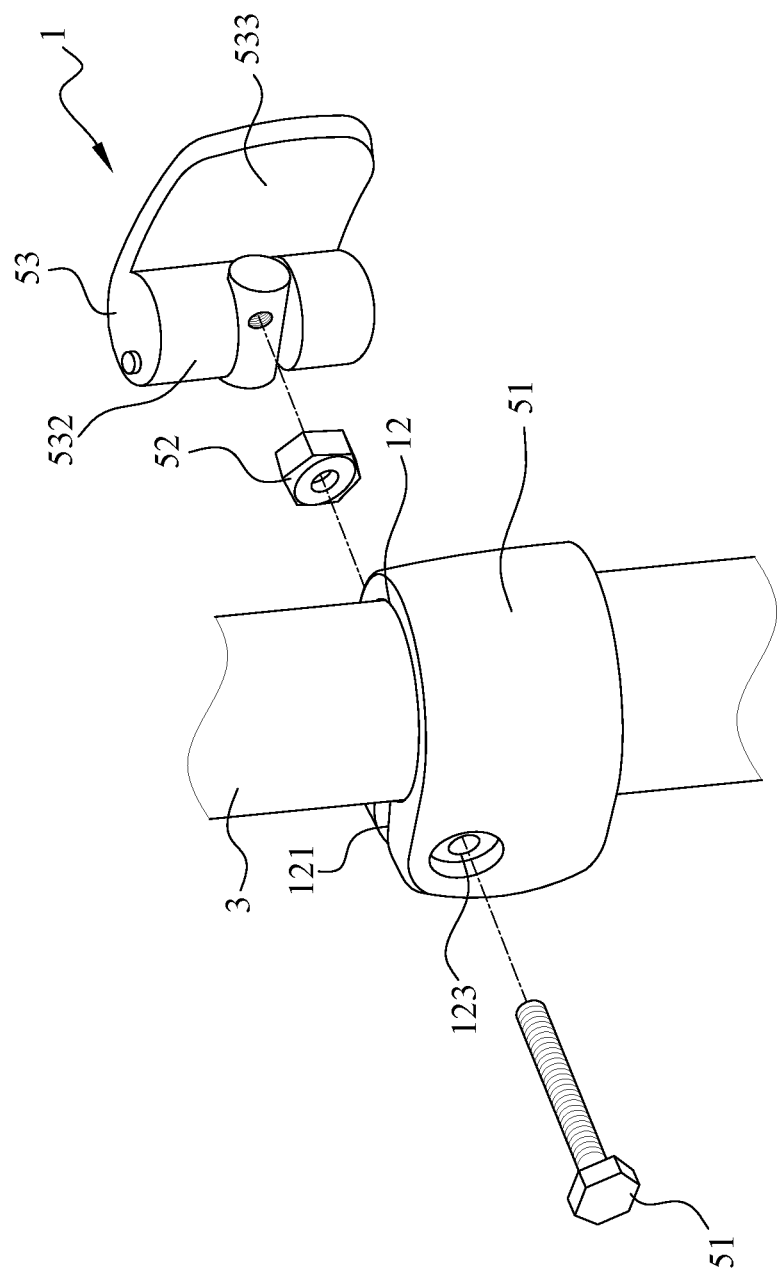
FIG. 6 a perspective view of a fastening device according to a third embodiment of the present invention.

FIG. 6 shows a perspective view of a fastening device according to a third embodiment of the present invention. The third embodiment is similar to the first embodiment in structure except that the tightening-enforcing element 53 has a flap portion 532 formed with a cam face 533 such that after the tightening-enforcing element 53 is mounted on the distal end of the fixing bolt 51, the cam face 533 is in contact with an exterior surface of the sleeve member 1 adjacent nut reception space 1221 so that turning of the flap portion 532 in a direction transverse to an axis of the fixing bolt 51 causes tightening of the fixing bolt 51 relative to the tightening-enforcing element 53 results in pressing the sleeve member 1 against the first tube 3 so as to immobilize the first and second tubes relative to each other.

It is to note that the fixing bolt and the fixing nut of the first fixing element can be mounted on the sleeve member in advance such that it is not required to mount them again during the application each time so that only further tightening of the former to the latter can be conducted as required.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A fastening assembly, comprising:
   a first tube;
   a tubular sleeve member adapted to be sleeved around the first tube, said tubular sleeve member defining a first reception space for receiving the first tube therein and a first notch for access into said first reception space and having an inner wall surface confining said first reception space, said tubular sleeve member further having first and second through holes aligned with said first notch and a nut reception space defined in said first through hole; and
   a first fixing element mounted on said tubular sleeve member at said first notch, said first fixing element including a fixing nut disposed within said nut reception space, a fixing bolt extending through said second through hole and said first through hole to fasten said fixing nut threadedly and a tightening-enforcing element disposed exterior of the nut reception space and mounted on a distal end of said fixing bolt such that tightening of said first fixing element relative to said fixing nut during a first section results in narrowing of said first notch and permits axial movement of said tubular sleeve member on the first tube and after tightening of said fixing bolt relative to said fixing nut, further tightening of said tightening-enforcing element relative to said fixing bolt in a second section pushes said tightening-enforcing element to contact with and press on said tubular sleeve member and results in pressing of said inner wall surface against the first tube, thereby causing tight engagement of the inner wall surface confining said first reception space and the first tube to immobilize said tubular sleeve member and the first tube.

2. The fastening assembly according to claim 1, wherein a second tube is provided to permit telescopic insertion of the first tube into the second tube, wherein the second tube has a diameter greater than that of the first tube.

3. The fastening assembly according to claim 2, wherein said tubular sleeve member further defines a second reception space spatially communicated with the first reception space and a second notch for access into said second reception space, the fastening assembly further comprising a second fixing element mounted on said tubular sleeve member at said second notch such that tightening of the second fixing element relative to said tubular sleeve member results in pressing of said inner wall surface against the second tube, thereby causing tight engagement of the inner wall surface confining said second reception space and the second tube to prevent untimely removal of said tubular sleeve member from the second tube, and wherein tightening of said fixing bolt relative to said fixing nut during said first section results in narrowing of said first notch and permits axial movement of the first tube within the second tube and said tubular sleeve member without wobbling, and after tightening of said fixing bolt relative to said fixing nut, further tightening of said tightening-enforcing element relative to said fixing bolt in said second section results in pressing said tubular sleeve member against the first tube so as to immobilize the first and second tubes relative to each other.

4. The fastening assembly according to claim 3, wherein said second fixing element is constituted by a locking bolt and a fastener nut.

5. The fastening assembly according to claim 1, wherein said tubular sleeve member further has an inner peripheral wall that extends transversely relative to an axis of the first tube and is formed with first and second engagement recesses, which are of different depth and located exterior of the nut reception space, said tightening-enforcing element has an engaging rib formed on its outer surface thereof such that after said tightening-enforcing element is mounted on said distal end of said fixing bolt, said engaging rib engages in said first engagement recess and after tightening of said tightening-enforcing element relative to said fixing bolt in said second section, said engaging rib engages in said second engagement recess in said tubular sleeve member, and said first engagement recess has a depth greater than that of said second engagement recess.

6. The fastening assembly according to claim 1, wherein said tightening-enforcing element has a flap portion formed with a cam face such that after said tightening-enforcing element is mounted on said distal end of said fixing bolt, said cam face is in contact with an exterior of said tubular sleeve member adjacent the nut reception space so that turning of said flap portion in a direction transverse to an axis of said fixing bolt causes tightening of said tightening-enforcing element relative to said fixing bolt in said second section.

* * * * *